Sept. 8, 1964 C. THUMIM 3,148,361

MAGNETIC STORAGE MECHANISM AND SYSTEM FOR BACK GAUGE CONTROL OF A PAPER CUTTER

Filed Jan. 26, 1961 6 Sheets-Sheet 1

INVENTOR.
CARL THUMIM

BY
OSTROLENK, FABER, GERB & SOFFEN
ATTORNEYS

Sept. 8, 1964 C. THUMIM 3,148,361

MAGNETIC STORAGE MECHANISM AND SYSTEM FOR BACK GAUGE CONTROL OF A PAPER CUTTER

Filed Jan. 26, 1961 6 Sheets-Sheet 2

INVENTOR.
CARL THUMIM

BY

OSTROLENK, FABER, GERB & SOFFEN

ATTORNEYS

Sept. 8, 1964 C. THUMIM 3,148,361

MAGNETIC STORAGE MECHANISM AND SYSTEM FOR BACK GAUGE CONTROL OF A PAPER CUTTER

Filed Jan. 26, 1961 6 Sheets-Sheet 3

INVENTOR.
CARL THUMIM

BY

OSTROLENK, FABER, GERB & SOFFEN

ATTORNEYS

Sept. 8, 1964 C. THUMIM 3,148,361

MAGNETIC STORAGE MECHANISM AND SYSTEM FOR BACK GAUGE CONTROL OF A PAPER CUTTER

Filed Jan. 26, 1961 6 Sheets-Sheet 4

INVENTOR.
CARL THUMIM

BY
OSTROLENK, FABER, GERB & SOFFEN

ATTORNEYS

INVENTOR.
CARL THUMIM
BY
OSTROLENK, FABER, GERB & SOFFEN
ATTORNEYS

Sept. 8, 1964 C. THUMIM 3,148,361

MAGNETIC STORAGE MECHANISM AND SYSTEM FOR BACK GAUGE CONTROL OF A PAPER CUTTER

Filed Jan. 26, 1961 6 Sheets-Sheet 6

INVENTOR.
CARL THUMIM

By
OSTROLENK, FABER, GERB & SOFFEN
ATTORNEYS

United States Patent Office 3,148,361
Patented Sept. 8, 1964

3,148,361

MAGNETIC STORAGE MECHANISM AND SYSTEM FOR BACK GAUGE CONTROL OF A PAPER CUTTER

Carl Thumim, Westbury, N.Y., assignor to Miehle-Goss-Dexter, Incorporated, Chicago, Ill., a corporation of Delaware Filed Jan. 26, 1961, Ser. No. 85,110
4 Claims. (Cl. 340—174.1)

This invention relates to automatic programming of a series of predetermined distance movements for a paper cutting machine back gauge, and more particularly to a magnetic signal storage mechanism and system for effecting control.

The general subject matter of the invention relates to a disclosure in the patent application of Carl Thumim, Serial No. 840,281, filed September 16, 1959.

In general, the objects of the invention are as follows:

To obtain the advantages of extremely long tape in a compact mechanism by providing a plurality of program channels.

To eliminate play and looseness between the magnetic storage means and the means for driving the tape.

To render multiple programs selectively and easily accessible. To accurately position a selected program or channel at the same initial position from time to time and over varying external conditions.

To provide a mechanism wherein the tape is not subjected to the usual flexing and wear factors when in controlling operation.

To increase the life of the tape in use.

To effect a readily replaceable magnetic recording element.

Briefly, the above objects are obtained by providing means for winding, from a storage reel, a conventional magnetic tape spirally on a rotary magnetic tape carrying drum, which drum is accurately positionable axially relative a magnetic playback head to align the head with a particular channel or recorded track. Thus, the channels are recorded parallel to the tape edge. The tape is wound at a helix on the drum and the drum is shiftable to align any track with a playback head or a recording head.

Further, the magnetic head means is provided with a shift device for fine adjustment with respect to the back gauge and to compensate for play in the overall mechanism and for time lapse in operation of the various components.

Many additional features are disclosed herein conjunction with the basic concept just described. For example, a device is provided that keeps the tape tension constant throughout the helical winding process while a required length amount of tape is transferred from the storage reel to the drum.

In adition to the above, there is provided a method of cyclically and automatically shifting from one channel to the next as each channel completes its program for the back gauge movement so that a program of very long duration may be carried sequentially on a plurality of channels.

A detailed description of the invention will now be given in conjunction with the appended drawing in which.

Figures 1, 9:
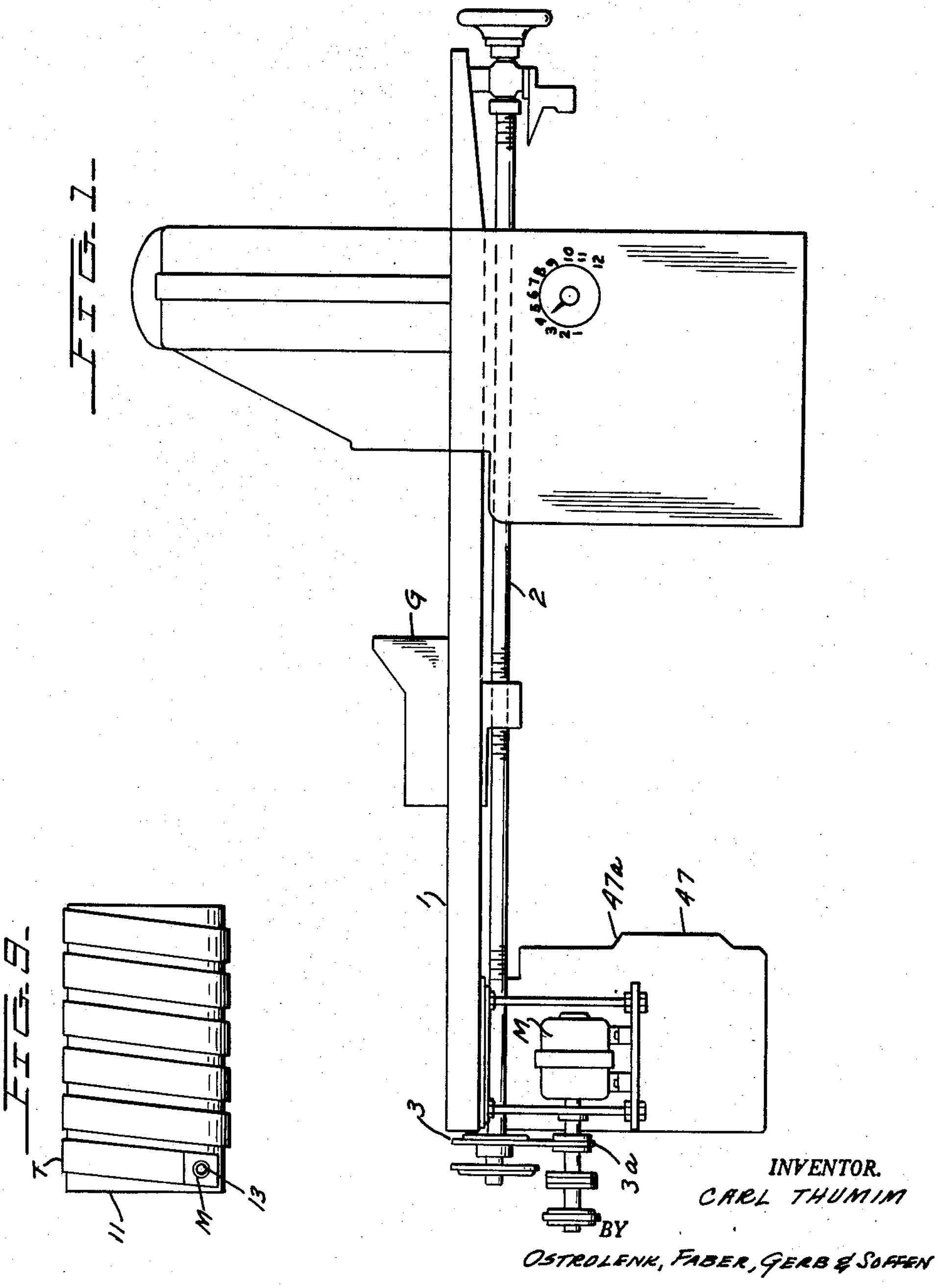
FIGURE 1 is an elevation view of a paper cutting machine showing the back gauge, the lead screw, the frame, and certain drive elements of the present invention.
Figure 2:
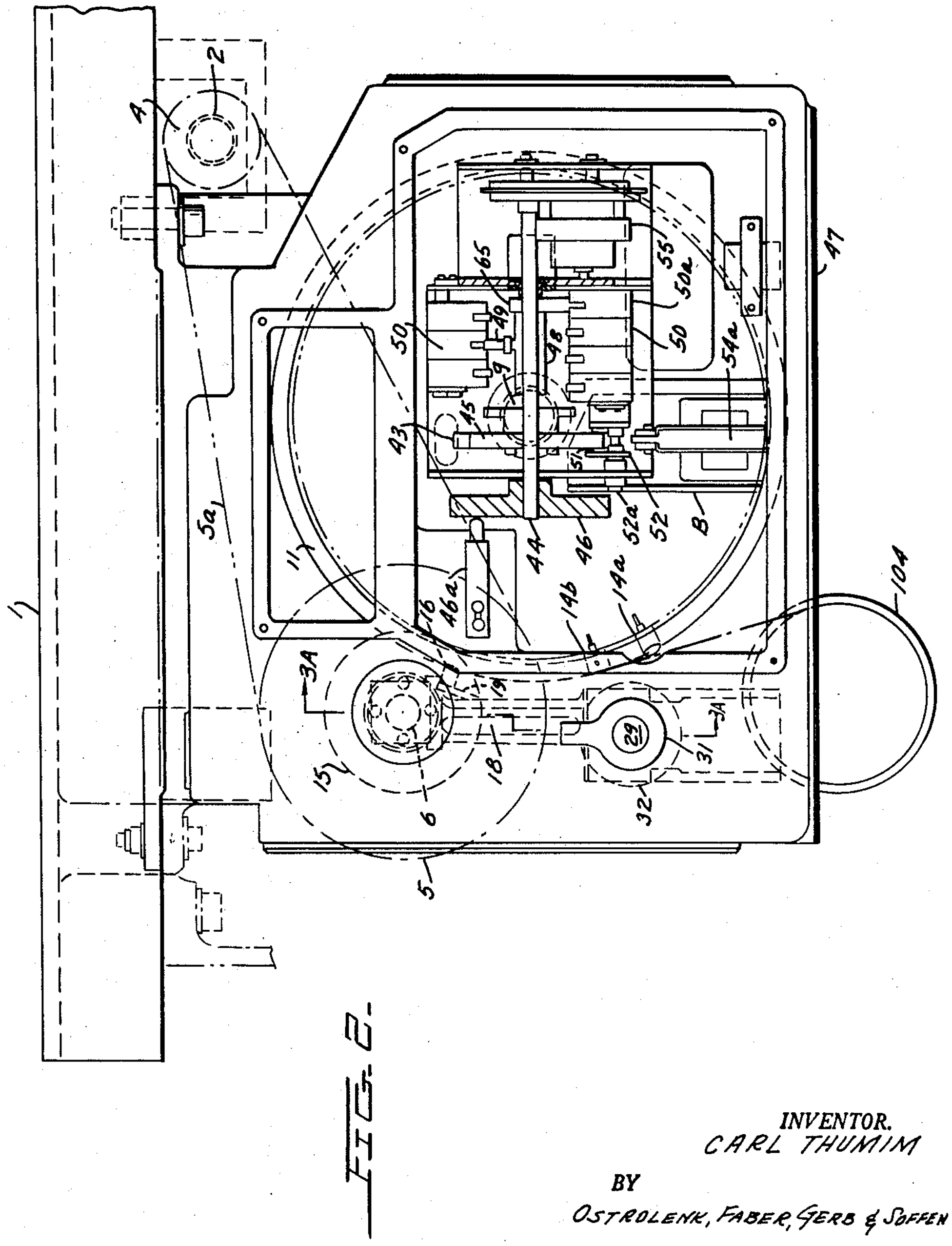
FIGURE 2 is an elevation in cross-section of the invention taken in a plane perpendicular to the lead screw of the paper cutter, showing the tape carrying drum circumferentially.
Figure 3A:
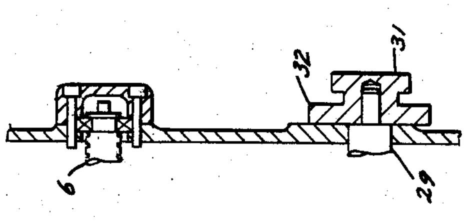
FIGURE 3 is a side view in elevation and shows a cross section of FIGURE 2 taken through the axis of the drum.
Figures 4, 5, 6:
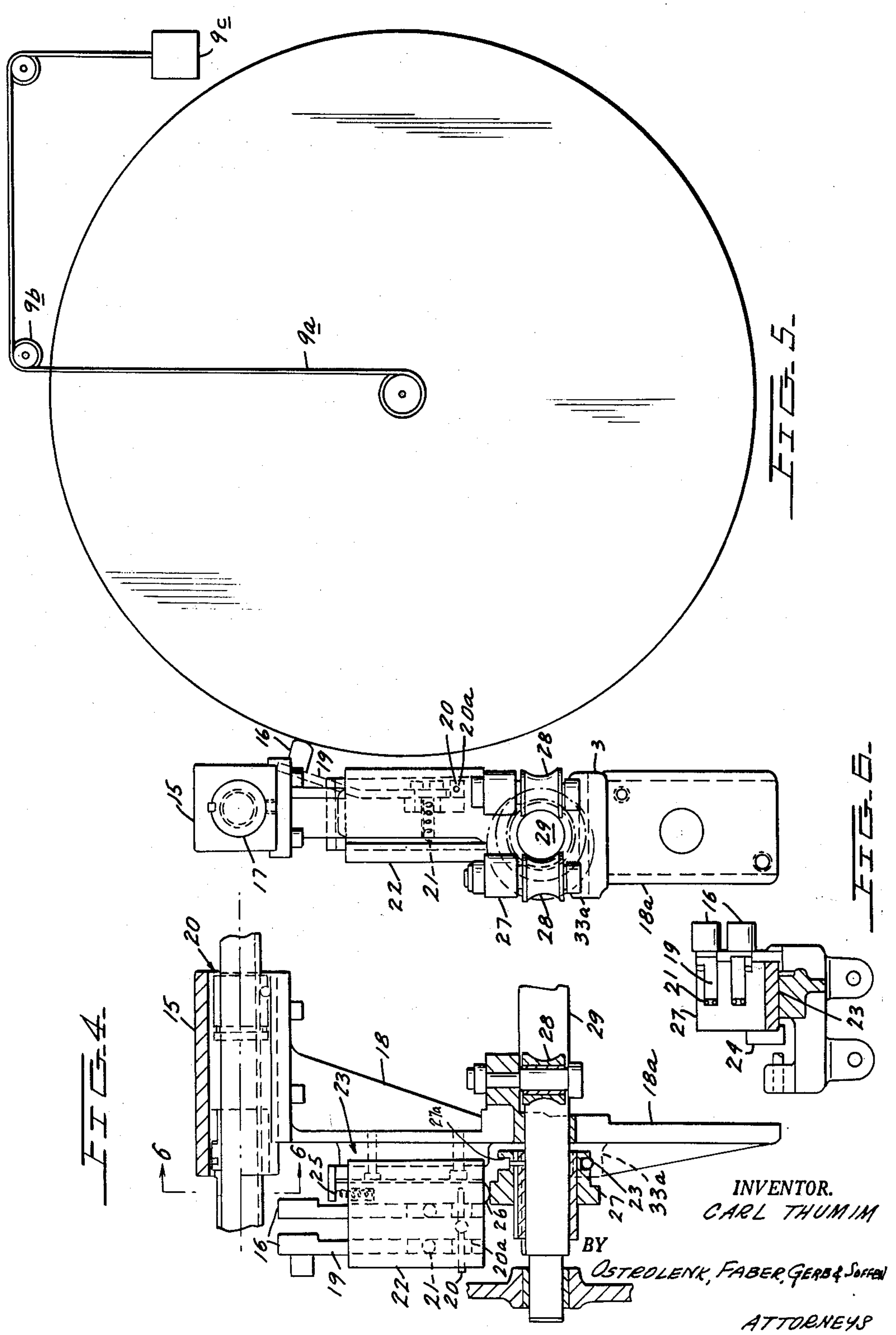
Figure 7:
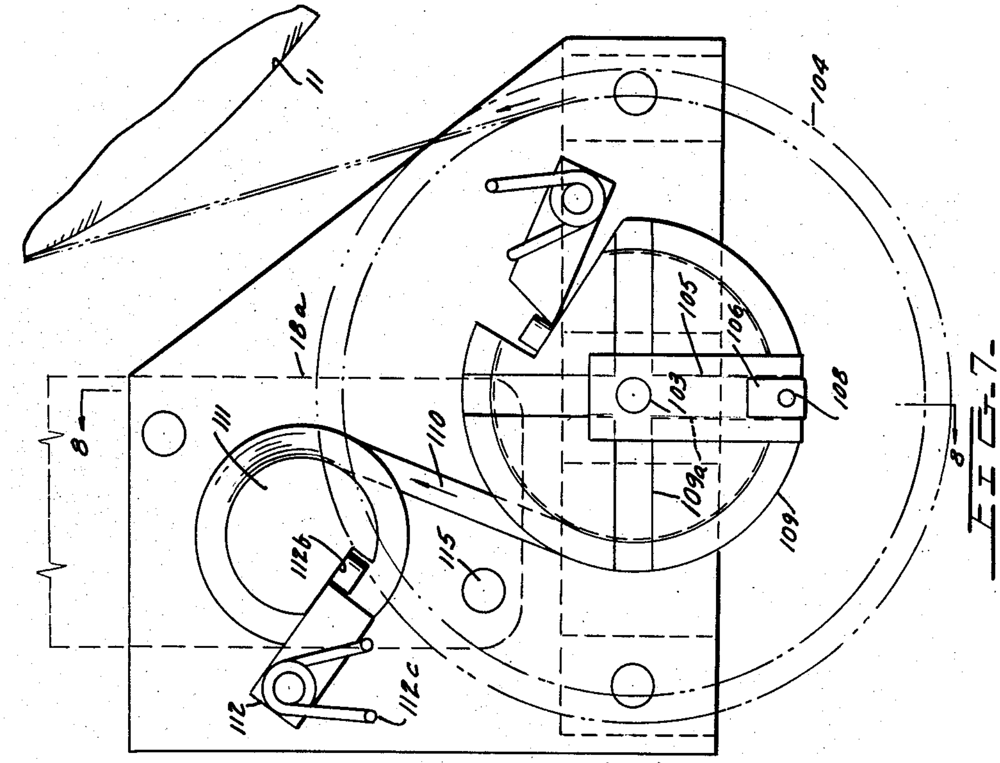
Figure 8:
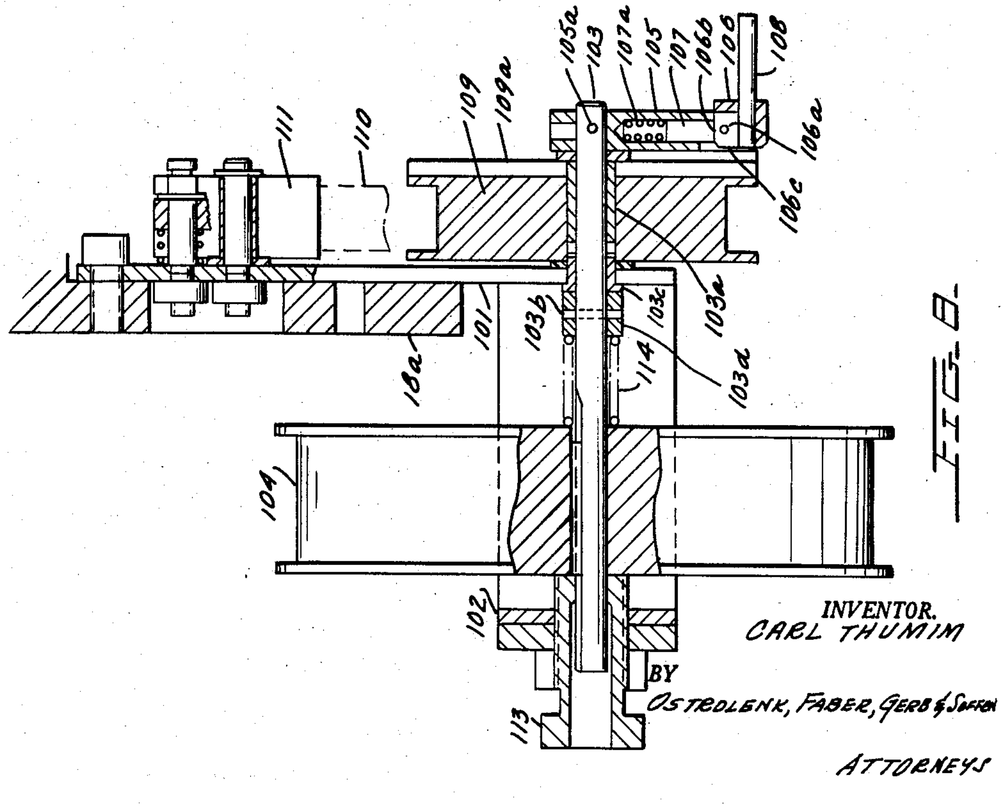
Figure 10:
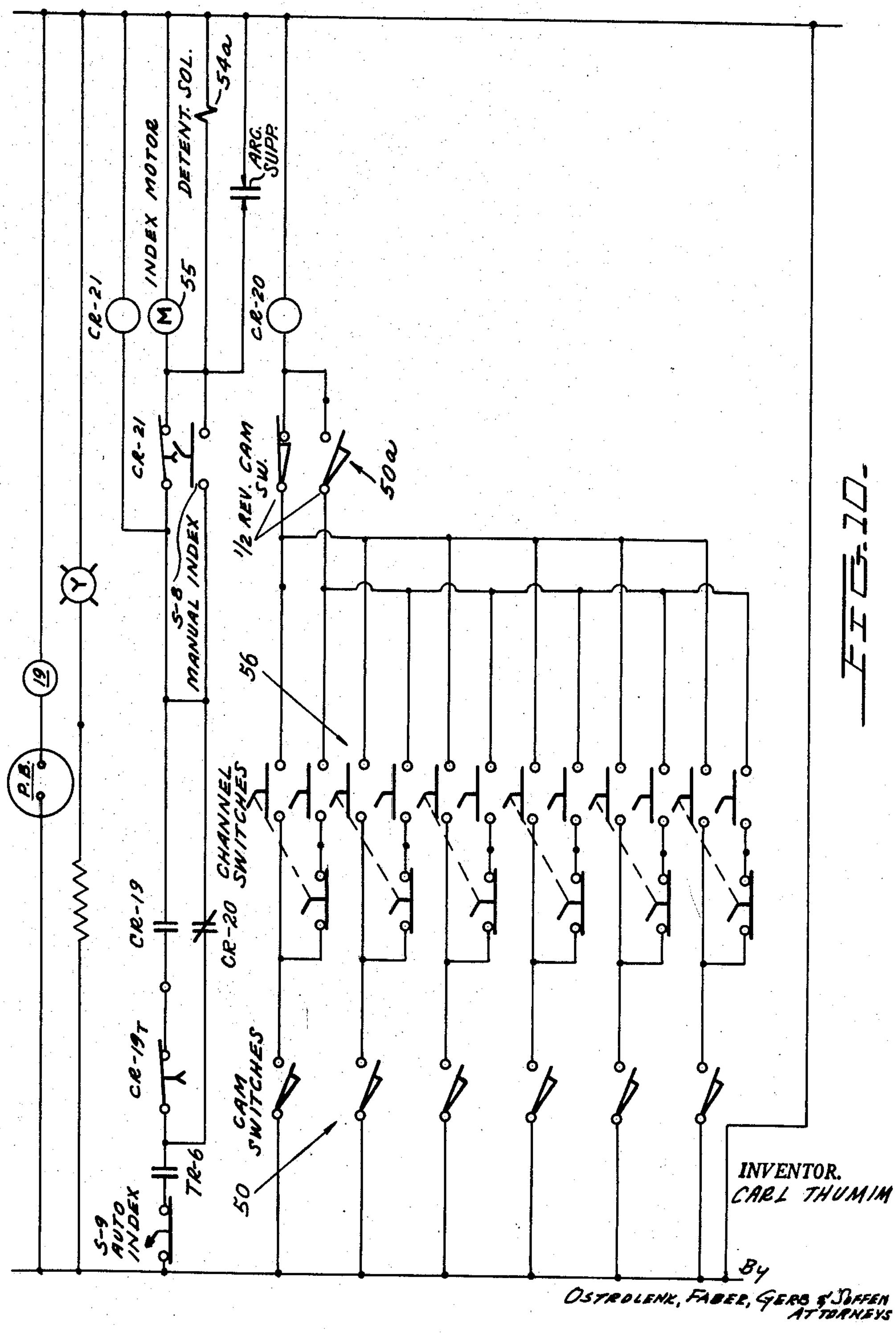

FIGURE 3*a* is a section through the line 3*a*—3*a* of FIGURE 2;

FIGURE 4 is an elevation view of the magnetic head assembly, partially in section, showing certain components of the magnetic head adjusting mechanism in a plane parallel to the drum axis;

FIGURE 5 is an end view of FIGURE 4 shown in conjunction with the drum on which the tape helix has been wound;

FIGURE 6 is a cross section on the line 6—6 of FIGURE 4;

FIGURE 7 is an elevation end view of the tape storage reel and tensison mechanism;

FIGURE 8 is an elevation view partly in cross-section through line 8—8 of FIGURE 7;

FIGURE 9 is a plan view showing the control drum with a tape helix wound thereon;

FIGURE 10 is a schematic diagram of the electrical control circuitry of the indexing motor for tape path selection used in conjunction with the programming function of the invention.

Referring now to the drawing, and in particular FIGURE 1, there is shown a conventional paper cutting machine having a cutter table 1 and carrying a back gauge G which is driven backwards and forwards by lead screw 2 to which lead screw is fastened a sprocket wheel 3. Sprocket wheel 3 is connected by a driving chain **3*a* to the motor M for driving lead screw 2** to drive the back gauge. A two speed (fast and slow) drive may preferably be used as shown in patents and applications assigned to the present assignee.

Figure 3:
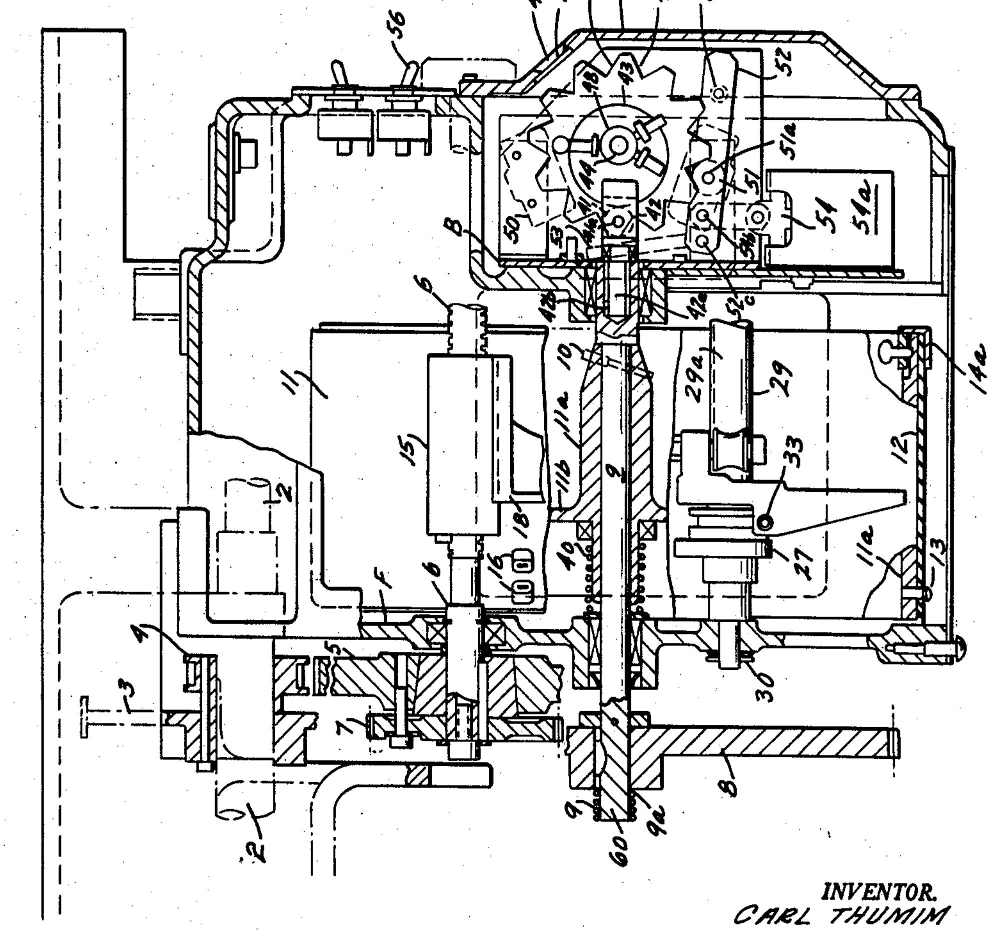

As seen in FIGS. 2 and 3, there is indicated (phantom lines) as fastened to the lead screw 2 a pulley 4 which drives a pulley 5 by means of a toothed timing belt **5*a*. The pulley 5 is carried by a threaded jack shaft 6 and is keyed thereto. The jack shaft 6 is carried by the machine frame F and carries a gear 7 keyed thereto, which gear 7 meshes with a gear 8 carried on an axially shiftable drum shaft 9 keyed thereto, which drum shaft carries the tape carrying drum 11. However, gears 7 and 8, although having relative tooth sliding, always remain in mesh. Thus, it will be seen that a positive drive is provided from the lead screw 2 to the drum shaft 9 so that the drum shaft 9 rotates in a fixed relationship with the movement of the back gauge on the table as effected by the lead screw 2**.

Shaft 9 provides for precision shifting of drum 11, axially to effect selection of recorded signal channels on the tape.

At one end of shaft 9 (as shown at the extreme left in FIGURE 3), the end of a flexible cable **9*a* is attached and a few turns are wrapped. A pulley 9*b* (shown in FIGURE 5) is provided over which the cable is passed and a weight 9*c* is attached thereto. The drum shaft 9** is biased thereby to a counter clockwise rotation.

Shaft 9 is supported rotatively and slidably by machine frame F.

Drum 11 is integrally attached to the shaft 9 as by pins 10 passing through drum hub **11*a* on the shaft. The hub has a radial flange 11*b* integral with the interior of the drum cylinder as shown. On the cylindrical surface of drum 11 is a soft rubber pad 12** for supporting a magnetic tape T helically and spacedly wound thereon, as shown in FIGURE 9. A usable width of the tape has been found to be 1″, for practical purposes, but other widths may be used.

As shown on FIGURE 9 at the end of the tape is a sheet metal reinforcement M which slips over a pin 13 on the drum 11. After tape T is wound helically on drum 11 the loose end is gripped by clamps **14*a* and 14*b*** located by means of slots in the drum surface, FIGURE 3.

The tape T is doubled back from clamp **14*a*** and again clamped by clamp 14b. This snubbing action holds the tape firmly in place at the termination of the winding, the winding method to be later described.

As shown in FIGURE 3, the jack shaft 6 coacts threadedly with a carriage 15 to move the carriage in step with the helically wound tape T on drum 11 so that a magnetic head, such as 16, carried by the carriage 15 via a bracket 18 and arms 19 will register continuously with a selected channel of the several channels recorded. The signal channels are recorded parallel to the edges of the helically wound tape, as hereinabove mentioned, and as the drum rotates, carriage 15 is axially moved by screw action of threaded shaft 6 to maintain head and channel alignment.

Carriage 15, as shown in FIGURE 4, is equipped with an anti-back lash nut system, generally indicated as 20, the details of which are not disclosed since they are substantially identical with the anti-back lash device shown in my copending application, Serial No. 52,128.

The head carrying arms 19 are pivotally secured on a pin 20 (FIGURES 4, 5) carried in bores of spaced ears 20*a*, on a block slide 22, reciprocally carried on carrying bracket 18. Pressure of the recording heads is maintained against the drum 11 by respective springs 21 suitably mounted, as shown.

A slide block 22 is provided to permit adjustment of the magnetic heads 16 in the direction of the tape helix angle so as to correlate them with recorded signals and visual markings previously placed on the recorded tape. This achieves an initial magnetic head position to compensate for time delays which are occasioned by action of relays and clutches in the back gauge control and actuating systems.

Block 22 is capable of motion at a predetermined angle to the axis of drum 11, which motion is at a slight angle away from vertical so as to be parallel to the tape helix. Block 22 is slidably guided by a track bar 23 integral with the bracket 18 and disposed longitudinally at the exact helix angle at which the tape is wound. Bar 23 is precision finished to prevent any looseness in the recording heads and block 22 is prevented from having side play by clamp elements 24, FIGURE 6.

Magnetic head carrying bracket 18 integral with carriage 15 has at its central portion a plurality of guide rollers 28 which bear against a shaft 29 carried by the machine frame to ensure a pure reciprocal motion of the magnetic heads 16, parallel to the axis of drum 11. The rollers 28 prevent bracket 18 from turning due to shaft 6 rotation.

The shaft 29 carries a manually operable cam 27 for the purpose of effecting adjustment of block slide 22 to set heads 16 at precise level relative drum 11. Thus, the cam 27 engages a cam follower 26 at the lower end of a pin 26*a* which is integrally attached to block slide 22, so that upon rotation of the cam 27, the follower, block slide, and the magnetic heads all move in an exactly straight line at the helix angle, with positive engagement between the cam 27 and the cam follower 26 provided by a spring 25.

The cam 27 is slidably splined on shaft 29 by means of a pin 29*a* protruding into a slot 29*b* of the shaft. Also, cam 27 has relative rotation with respect to bracket 18 but is longitudinally fixed with respect thereto by engagement of the central portion of a pin 33 engaging an annular groove 27*a* in cam 27, which pin is carried at its ends in bosses 33*a* of bracket 18.

Adjustment, rotationally, of cam 27 is obtained (FIGURES 2 and 3*a*) by turning a knob 31 which is fixedly attached to shaft 29 and is frictionally held by spring pressure washer 30 and carries a calibrated scale 32 to show the amount of adjustment in either direction. Thus, the arrangement effects, by rotation of knob 31, an exact registering of the recording heads to marked positions on the tape for a compensating advance in the position of the heads with respect to the back gauge position, allowing a pre-settable time differential to allow for such variations at the rate of advance of the back gauge and time of action of the control relays and clutches.

As heretofore mentioned, a plurality of channels is provided on the tape parallel to the tape edges; in this specific instance the tape is provided with twelve channels, two groups of six channels per group for electrical control purposes, alternately interspaced.

Channel selection is provided by an axial movement of shaft 9 to shift the drum 11 (FIGURE 3). Axial movement of shaft 9 is accomplished by longitudinal pressure exerted by a modified cardioid cam 43 carried on a shaft 44 and acting against a roller type cam follower 41 which is rotatively carried on a short shaft 41*a* held between the fingers of a clevis 42. Clevis 42 has an extension 42*a* freely held in a socket 42*b* in the end of shaft 9, as shown. Shaft 9 is biased, and in turn biases the cam follower 41 against cam 43 by a compression spring 44*a* seen at the left end of drum hub 11*a*, as viewed in FIGURE 3.

The arrangement makes possible very accurate displacements of drum 11 by rotational adjustment of cam 43 via shaft 44 by a motorized system to be later described.

Still referring to FIGURE 3, detent means is disclosed for maintaining cam 43 in any one of a selected position of twelve positions corresponding to the twelve channels recorded on the tape, or to be recorded. Thus, a detent plate or wheel 45 divided into twelve notches, such as 45*a*, is carried on shaft 44 and is suitably keyed thereto so as to be integral with cam 43. A detent roller 51 is carried on a short shaft 51*a* disposed intermediate the arms of a clevis 52 pivoted as by a pin 52*b* to the machine frame. Various supports or brackets, generally designated by the reference character B, are utilized to support the pin as well as other parts of the construction, the support details being understood to be present without detailed description. The free end of clevis 52 is attached as by a pin 52*c* to a tension spring 53, the upper end of the spring being fastened to the machine by a pin or rivet, as shown. Thus, the clevis 52 is biased upwardly to effect engagement of the roller in any of the detent notches. A solenoid 54*a* controls a plunger 54 attached as by a pin 54*b* to clevis 52. Energization of the solenoid effects a downward pull on the clevis to bring roller 51 away from the detent wheel so that the wheel can rotate to permit rotation of cam 43 when shaft 44 is rotated to shift drum 11 for channel selection.

A drum shifting motor 55 (right-hand end of FIGURE 2) is utilized to power the shaft 44 and thus the cam 43. A manually settable switching arrangement (switches 56) selective to control the duration of energization of the motor is provided, so that a desired setting of cam 43 for selection of a channel is obtained by shifting drum 11 precisely relative the width of a strand of tape. It will be, of course, understood that the tape is about 1" wide so that full rotation of cam 43, having approximately a one-quarter inch eccentricity, will provide a full shift of relative motion from edge to edge of a tape strand for two heads spaced ½" apart.

Motor 55 is arranged so that the armature is spring displaced axially off-center when the current is off. However, energization of the motor effects movement of the armature which carries a pinion on its shaft into engagement with a gear that drives shaft 44. The motor is, of course, suitably geared down to a prerequisite speed, and the shifting of the shaft to engage or disengage the pinion and gear effects a clutch. In this way, the de-energization of the motor effects release of load on shaft 44 due to motor gearing in order to permit the tension spring 53 to pull roller 51 into engagement with the detent wheel 45 in a selected position for cam 43. The electrical circuitry arrangement is such that solenoid 54 is energized simultaneously with energization of motor 55 so as to release the detent device and permit free rotation of cam 43.

An explanation of the circuitry of FIGURE 10 is as follows:

Automatic selection of channels is accomplished in a manner somewhat similar to that shown in my previous patent application Serial No. 761,039 now Patent No. 3,031,054. However, in this instance, the channels are preselected by operation of any combination of the twelve manually operated toggle switches 56, FIGURE 3. The electrical circuitry (also see FIGURE 10) also provides for respective coacting switches 50, which are provided in banks of six, by means of six adjustable actuators 49 carried on a timing sleeve 48 keyed to shaft 44. In order to operate either bank of switches 50, a throw-over switch 50*a* is actuated by a semi-circular segment cam 65, all as indicated in FIGURE 2. The arrangement is such that for one side of the cardioid cam 43, six of the toggle switches 56 are in circuit with six respective power-operated switches 50, the switch groups in action being determined by movement of switch 50*a*, as effected by cam 65.

Neon lamp Y indicates that the spacing circuit is on. Since a neon lamp of very low resistance is used, it requires a series resistor, as shown, of 20,000 to 40,000 ohms depending on the life and voltage required.

Basically, when CR20 relay is energized, the index motor 55 stops and the heads are in line with the channel for which both channel switch 56 and its corresponding cam switch 50 are closed.

Transference to another chanel is done when the back gauge has reached its furthest front position and is on the way back. The contact TR6 is an interlock to indicate that the back gauge is set for reverse. Switch S9 gives the operator a choice of indexing or not indexing. The front limit switch PB closes to pick up relay 19 closing its normally open contact CR19 and energizing motor 55 and detent solenoid 54*a*, thus starting the indexing cycle. The time delay contact $CR19_T$ remains closed until just after the cam switch 50, which had stopped the indexing on the previous cycle, has broken contact and deenergized CR20 thus causing the normally closed contact of CR20 to keep the index motor energized after $CR19_T$ has opened the circuit. The indexing will then continue until the next 50–56 switch combination again energizes relay CR20 when its normally closed contact CR20 will open the motor circuit.

In case the operator does not have any of the channel switches closed, CR20 would never be picked up to cut off the index motor which would continue to run indefinitely. To guard against this unnecessary wear, CR21 is picked up at the same time with the index motor. After a period of time sufficiently long to permit a little more than one complete turn of the indexing cam, its time delay will become effective to open up normally closed contact CR21 to stop the motor. In normal operation, this contact should never open.

With the back gauge in a full front position so that switch PB is closed and relay 19 energized for reverse motion so that TR6 is closed but the reverse motion prevented by a manual switch (not shown) it is possible to index from channel to channel by operation of switch S8. In other words, if the setup calls for channel 7 to be in operation, closing S8 will change to the next channel for which switches 50 and 56 will be aligned.

An arc suppressor in parallel with the index motor and the detent solenoid is shown on FIG. 10. This is a rectifier connected back to back so that no A.C. voltage will pass but with a Zener value of a small margin above the normal voltage so as to hold down the self-induced voltage on the solenoid when contact CR20 is opened. This, of course, reduces the burning of the contacts and prevents radio interference with the sensitive magnetic circuitry.

Shaft 44, as shown in FIGURES 2 and 3, carries an indicator disk 46 on the cylindrical edge surface of which are numerical markings corresponding to the twelve tracks or channels on the tape. A lamp 46*a*, as shown in FIGURE 2, may be utilized to illuminate the disk which is visible through a window 47 (FIGURE 3) to an operator.

For the purpose of effecting a helical winding of tape on drum 11 in proper position and with proper tension so that it will not become slack due to changes in temperature and humidity, a device is provided as generally disclosed in FIGURES 7 and 8.

Referring to these figures of the drawing, an extension 18*a* of the carriage carries a removable plate 101 to which is suitably secured an open rectangular loop frame 102; through the pair of parallel sides of the frame 102 and plate 101 passes a shaft 103 carried in a sleeve 103*c* and 112. Collar 103*d* is fixed to shaft 103 by rivet 103*b* to restrain shaft 103 axially and to act as a shoulder for spring 114. On shaft 103 is slidably keyed a tape storage reel 104. A crank arm 105 is pined at 105*a* to shaft 103, which arm carries at its lower end a block 106 pivoted thereto as by a pin 106*a*. It will be noted that block 106 is generally square so as to co-act with a plunger 107, spring biased as by a spring 107*a* to maintain the plunger pressed against the face 106*b* of the block in the position shown in FIGURE 8, or, if the block be rotated 90° clockwise, the plunger presses against the face of the block 106*c*.

For the purpose of maintaining a steady tension on reel 104 when tape is being pulled from it, a negator spring motor comprising a drum 109 having a side slot 109*a*, a negator spring 110, and a drum 111 are provided.

The arrangement of the slot 109*a* coacting with the pivotal block 106 is such that when block 106 is rotated so that handle 108 is in alignment with arm 105, the portion of the block shown lowermost in FIGURE 8 can swing into the slot and thus lock arm 105 and drum 109 in relatively non-rotative condition.

The negator spring and drum arrangement constitutes a constant and uniform torque spring motor and is of generally known use for the particular purpose here employed. Thus, drum 109 rotates freely on sleeve 103*a* but can be locked to the sleeve when handle 108 is swung to the downward position so as to lock the block 106 in groove 109*a*.

The arrangement of drums 109 and 111 is such that the negator spring 110 can be wound from one drum to the other, and at the termination of winding off either drum, a pawl such as 112 can drop into a notch in drum 111 to stop further rotation of the drum. Thus, the negator spring, being wound around the drum covers drum notch 112*b* and normally blocks the pawl 112 under bias of spring 112*c* from moving into the notch. However, as the last turn from drum 111 is taken off, at about the time that only a half turn of the spring remains on the drum, the notch is exposed and pawl 112 can move into the notch to prevent further rotation of the drum, thus precluding tearing the spring off the drum. The same arrangement is shown for the spring drum 109.

In operation, the entire storage reel and negator motor spring assembly is separate from the cutting machine being carried on the removable plate 101. At this time, by means of rotation of the crank handle 108, a quantity of tape is wrapped around drum 104, handle 108 being, of course, in the position shown in FIGURE 8. Thereafter, handle 108 is swung downwardly thus locking shaft 103 and drum 104 to motor drum 109. It will be understood that the spring 110 is fully wound on drum 111 at this time. Plate 101 is then attached to the extension 18*a* of carriage 15 and the tape end attached to drum 11 by means of the pin 13. The lead screw of the machine is then rotated to pull tape off reel 104 and wind it helically on the drum. At this time reel 104 effects rotation of shaft 103 which, then being locked via block 106 to drum 109 likewise effects rotation of that drum to pull negator spring 110 from drum 111 at a steady and uniform tension which is transmitted to the tape so as to maintain constant tension thereon. The arrangement is, of course, such that spring 110 is long enough so as to normally not completely unwind from drum 111. However, the spring can be just long enough so that as unwinding takes place, it will be fully exhausted but not leave the drum to the action of pawl 112, which will stop rotation as above explained.

When the tape drum 11 has been fully wound and still under tension, it is fastened to the drum by clamps 14*a*, then clipped and fastened finally by 14*b* as shown in FIGURE 2.

In order to properly position reel 104 axially with respect to the tape drum 11 so as to start the helical winding at the right point, reel 104 is axially shiftable on shaft 103 by means of a threaded sleeve 113 acting against the reel and forcing it against a compression spring 114 carried on shaft 103. It will be understood that since the right hand end of spring 114 acts against a flange of the sleeve 103*a*, which is integral with shaft 103, any compression in the spring will not result in a frictional drag on the reel 104.

Having thus described my invention I am aware that various changes may be made without departing from the spirit thereof and, accordingly, I do not seek to be limited to the precise illustration herein given except as set forth in the following claims.

I claim:

1. A back gauge programming control mechanism comprising a rotative drum, means for rotating said drum, a helical winding of magnetic recording tape fixed on said drum and relatively non-movable thereon and rotative therewith and magnetic head means disposed for picking up signals at selective positions across the width of said tape as said drum rotates, including means for serving tape to said drum for helical winding thereon, said means comprising an assembly having a tape storage reel upon which tape may be initially wound for re-winding onto said drum, said assembly further including means for effecting uniform torque resistance to rotation of said reel as tape is pulled therefrom onto said drum by rotation of said drum, a support element integrally carrying said reel and said uniform tensioning means, said support element being attachable to and removable from said machine with said assembly in place on said support element, said uniform tensioning means comprising a shaft, said reel being mounted on said shaft, a crank for rotating said shaft to initially wind tape on said reel, a constant tension spring assembly comprising a constant tension spring drum mounted on said shaft and means for effecting locking or unlocking of said drum to said shaft, a second constant tension spring drum carried by said support element, and a constant tension spring intermediate said negator spring drums and secured at respective ends thereto and reversibly windable from one negator spring drum to the other.

2. A back gauge programming control mechanism comprising a rotary drum, a helical winding of signal tape fixed on said drum relatively non-movable thereon and rotative therewith; means to effect rotation of said drum, a sensing device for sensing signals on said tape as said drum rotates, actuating means for moving said sensing device in a path parallel to the rotary axis of said drum as said drum rotates to effect registry with a precise path of signals on said tape, support means for said sensing device and adjusting means operative to shift said support means in the plane of said signal path to adjust said sensing device with respect to said path, said adjusting means comprising a shaft, a cam mounted on said shaft, means for rotating said shaft so as to rotate said cam, a cam follower carried by said support device and engageable by said cam, and guide means for said support device to guide reciprocal movement thereof at a precise angle corresponding to the helical angle of winding of said tape, wherein said signal path is parallel to the edge of said tape.

3. In a paper cutting machine, a back gauge programming control mechanism comprising a rotative drum, means for rotating said drum, a helical winding of magnetic recording tape fixed on said drum and relatively non-movable thereon and rotative therewith, and magnetic head means for picking up signals on said tape as said drum rotates, including shifting means for axially shifting said drum with respect to said magnetic head means so as to effect registry of a selected one of a plurality of recorded signal channels on a tape strand with said magnetic head means, said signal channels being applied to said tape in paths parallel to the edge thereof, said drum being mounted on a shaft, a cam follower carried by said shaft, a cam engageable with said follower, support means for said shaft permitting axial motion thereof, and detent means co-acting with said cam to hold said cam in a selected, adjusted position and cam actuating means for actuating said cam to precise, predetermined positions.

4. In a paper cutting machine as set forth in claim 3, said actuating means comprising an electric motor, electrically operated means for releasing said detent means, said electric motor and said electrically operated means being simultaneously energizable and said detent means comprising a spring biased pawl and a notched wheel, said pawl normally engaging said notched wheel to hold said cam in fixed position and said pawl being withdrawn to release said cam upon energization of said electrically operated means and said motor.

References Cited in the file of this patent

UNITED STATES PATENTS

| | | |
|---|---|---|
| 2,275,961 | Heller | Mar. 10, 1942 |
| 2,293,229 | Walker | Aug. 18, 1942 |
| 2,424,633 | Reiber | July 29, 1947 |
| 2,600,630 | Fergusson | June 17, 1952 |
| 2,698,217 | Ford | Dec. 28, 1954 |
| 2,733,753 | Schlesselman | Feb. 7, 1956 |
| 2,802,905 | Taris | Aug. 13, 1957 |
| 2,852,761 | Hagopian | Sept. 16, 1958 |
| 2,862,781 | Baumeister | Dec. 2, 1958 |
| 2,954,265 | Devaud | Sept. 27, 1960 |
| 2,992,578 | Hribar | July 18, 1961 |

FOREIGN PATENTS

| | | |
|---|---|---|
| 1,103,191 | France | May 18, 1955 |